(12) United States Patent
Otsuka et al.

(10) Patent No.: US 12,459,139 B2
(45) Date of Patent: Nov. 4, 2025

(54) BENDING STRUCTURE AND JOINT FUNCTION PART

(71) Applicant: NHK SPRING CO., LTD., Yokohama (JP)

(72) Inventors: Motoyuki Otsuka, Yokohama (JP); Takafumi Hirata, Yokohama (JP); Shimpei Kurokawa, Yokohama (JP); Yuki Hotoda, Yokohama (JP)

(73) Assignee: NHK Spring Co., Ltd.

( * ) Notice: Subject to any disclaimer, the term of this patent is extended or adjusted under 35 U.S.C. 154(b) by 603 days.

(21) Appl. No.: 17/799,384

(22) PCT Filed: Feb. 12, 2021

(86) PCT No.: PCT/JP2021/005247
§ 371 (c)(1),
(2) Date: Aug. 12, 2022

(87) PCT Pub. No.: WO2021/162089
PCT Pub. Date: Aug. 19, 2021

(65) Prior Publication Data
US 2023/0339124 A1 Oct. 26, 2023

(30) Foreign Application Priority Data
Feb. 13, 2020 (JP) ................. 2020-022901

(51) Int. Cl.
*B25J 18/06* (2006.01)
*A61B 17/29* (2006.01)
(Continued)

(52) U.S. Cl.
CPC ....... *B25J 18/06* (2013.01); *A61B 2017/2905* (2013.01); *A61B 2034/301* (2016.02); *A61M 25/0138* (2013.01)

(58) Field of Classification Search
CPC . B25J 17/00; B25J 17/02; B25J 9/1075; B25J 18/06; B25J 9/104; A61B 34/70;
(Continued)

(56) References Cited

U.S. PATENT DOCUMENTS

| 2,183,100 A | 12/1939 | Holland |
| 5,203,380 A * | 4/1993 | Chikama .............. A61B 1/0057 138/121 |

(Continued)

FOREIGN PATENT DOCUMENTS

| JP | S52-79947 U | 6/1977 |
| JP | 7-265323 A | 10/1995 |

(Continued)

*Primary Examiner* — Pamela Rodriguez
(74) *Attorney, Agent, or Firm* — Norris McLaughlin, P.A.

(57) ABSTRACT

Provided are a bending structure and a joint function part, capable of stabilizing bending operation and simplifying a structure. An inner coiled part is located into an outer coiled part. The outer coiled part and the inner coiled part have a plurality of gaps distancing adjacent coils in an axial direction, and the coils of the inner coiled part fit between the adjacent coils of the outer coiled part while being in contact with the adjacent coils. A dimension (P) is set in a range meeting $\pi(R)/4(N) \leq P < (d) - \pi(R)/4(N)$ in which (P) is the dimension of a gap of the outer coiled part in the axial direction in a free state, (N) is the number of turns of the outer coiled part, (R) is a diameter of the outer coiled part, and (d) is a wire diameter of the wire of the inner coiled part.

5 Claims, 6 Drawing Sheets

(51) Int. Cl.
*A61B 34/30* (2016.01)
*A61M 25/01* (2006.01)

(58) Field of Classification Search
CPC ......... A61B 17/29; A61B 34/30; A61B 34/71; A61B 17/28; A61B 2017/00305; A61B 2034/305; A61B 2017/2939; A61B 34/37; A61B 2034/301; A61B 2017/2918; A61B 2017/292; A61B 2017/2905; A61B 2017/2908; A61B 2017/00323; F16F 3/06; F16F 3/04; F16F 2236/025; A61M 25/0138
See application file for complete search history.

(56) References Cited

U.S. PATENT DOCUMENTS

| | | |
|---|---|---|
| 5,465,894 A | 11/1995 | Clark et al. |
| 2008/0161727 A1 | 7/2008 | Aimi et al. |
| 2011/0208092 A1 | 8/2011 | Nishigishi |
| 2012/0253324 A1 | 10/2012 | Lee et al. |
| 2021/0186637 A1 | 6/2021 | Kurokawa et al. |
| 2021/0307773 A1 | 10/2021 | Hirata et al. |
| 2023/0001590 A1 | 1/2023 | Hirata et al. |

FOREIGN PATENT DOCUMENTS

| | | |
|---|---|---|
| JP | 11-70488 A | 3/1999 |
| JP | 2008-178656 A | 8/2008 |
| JP | 2009-538186 A | 11/2009 |
| JP | 2011-167387 A | 9/2011 |
| JP | 2018-193832 A | 12/2018 |
| WO | 2019/073859 A1 | 4/2019 |
| WO | 2020/036085 A1 | 2/2020 |

\* cited by examiner

BENDING STRUCTURE AND JOINT FUNCTION PART

FIELD OF THE INVENTION

The present invention relates to a bending structure used for a joint function part of a robot or the like and a joint function part using the bending structure.

BACKGROUND OF THE INVENTION

Some robots, manipulators, actuators or the like have joint function parts to allow to be bent and extended. As such a joint function part, there is one using a flexible member as a bending structure as disclosed in Patent document 1, for example.

The flexible member of Patent document 1 is configured by swingably engaging a plurality of disc elements with each other to perform bending operation as a whole according to swinging of each disc element.

Accordingly, the flexible member smoothly performs the bending operation and assures rigidity against compression in an axial direction, to stabilize the bending operation.

The flexible member, however, has a problem that the structure is complicated because the plurality of the disc elements are engaged with each other.
PATENT DOCUMENT 1: JP 2009-538186 A

SUMMARY OF THE INVENTION

A problem to be solved is that a structure is complicated to stabilize bending operation.

The present invention provides a bending structure capable of stabilizing bending operation and simplifying a structure. The bending structure being bendable with respect to an axial direction, comprises an outer coiled part formed of a wire which is wound in a coiled shape to have a plurality of coils in the axial direction, and an inner coiled part formed of a wire which is wound in a coiled shape to have a plurality of coils in the axial direction and located inside the outer coiled part. The outer coiled part has a plurality of gaps to distance adjacent coils in the axial direction, and the coils of the inner coiled part are provided so as to correspond to the gaps of the outer coiled part and fit between the adjacent coils of the outer coiled part while being in contact with the adjacent coils of the outer coiled part. A dimension P is set in a range meeting $\pi R/4N \leq P < d - \pi R/4N$ in which P is the dimension of the gap of the outer coiled part in the axial direction in a free state, N is the number of turns of the outer coiled part, R is a diameter of the outer coiled part, and d is a wire diameter of the wire of the inner coiled part.

Further, the present invention provides a joint function part to which the bending structure is applied. The joint function part comprises a base part and a movable part displaceable relative to the base part, wherein the bending structure is provided between the base part and the movable part to bend according to displacement of the movable part relative to the base part.

According to the present invention, the bending structure is configured by locating the inner coiled part inside the outer coiled part, so that the structure is simplified.

Further, the coils of the inner coiled part fit between the adjacent coils of the outer coiled part while being in contact with the adjacent coils of the outer coiled part, so that rigidity in the axial direction is ensured.

As a result, the present invention stabilizes bending operation and simplifies the structure.

Furthermore, operation is smoothly performed without a catch according to the setting of the gap between the coils of the outer coiled part when the bending structure returns back to an original state after bent at 90 degrees.

EMBODIMENT FOR CARRYING OUT THE INVENTION

Figure 1:
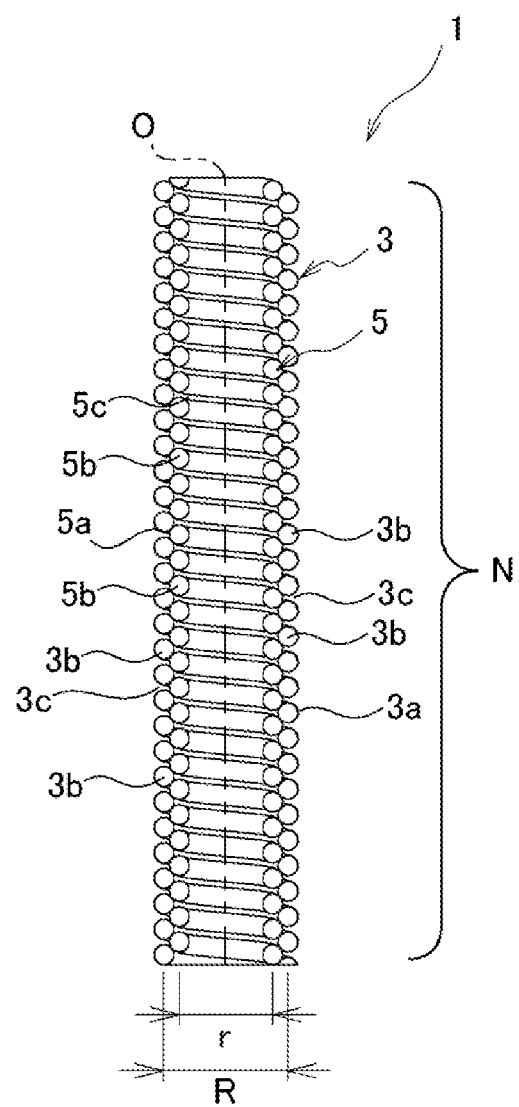
FIG. 1 is a sectional view illustrating a bending structure according to an embodiment 1 of the present invention.

The object that a structure is simplified while stabilizing bending operation is accomplished by a bending structure of double coils in which an inner coiled part is located inside an outer coiled part while operation is smoothed.

The bending structure (1) is bendable with respect to an axial direction, comprising an outer coiled part (3) formed of a wire (3*a*) which is wound in a coiled shape to have a plurality of coils (3*b*) in the axial direction, and an inner coiled part (5) formed of a wire (5*a*) which is wound in a coiled shape to have a plurality of coils (5*b*) in the axial direction and located inside the outer coiled part (3).

It should be noted that bending means that an axis (0) of the bending structure (1) is curved or bent.

The outer coiled part (3) has a plurality of gaps (3*c*) to distance adjacent coils (3*b*) in the axial direction, and the coils (5*b*) of the inner coiled part (5) are provided so as to correspond to the gaps (3*c*) of the outer coiled part (3) and fit between the adjacent coils (3*b*) of the outer coiled part (3) while being in contact with the adjacent coils of the outer coiled part.

The outer coiled part (3) may have the gaps (3*c*) in respective interspaces of the axially adjacent coils (3*b*), but may be configured to have the gaps (3*c*) only in part in the axial direction.

In the bending structure (1), a dimension P is set in a range meeting $\pi R/4N \leq P < d - \pi R/4N$ in which P is the dimension of the gap (3*c*) of the outer coiled part (3) in the axial direction in a free state, N is the number of turns of the outer coiled part (3), R is a diameter of the outer coiled part (3), and d is a wire diameter of the wire (5*a*) of the inner coiled part (5).

The free state means a state in which the bending structure (1) is not bent, and is a straight or an arc basic posture.

Sectional shapes of the wires (3*a* and 5*a*) of the outer coiled part (3) and the inner coiled part (5) may employ appropriate shapes such as circle and oval having wire diameters. The wire (3*a*) of the outer coiled part (3) is, however, preferable to have a sectional shape being a circular arc at least on an inner side in a diametral direction of the coiled shape such as a circular shape, a semi-circular shape, or a combination of a semi-circular shape and a semi-oval shape. The same holds for the sectional shape of the wire (5a) of the inner coiled part (5). In the case of the inner coiled part (5), however, it is preferably to make a sectional shape be a circular arc at least on an outer side in the diametral direction of the coiled shape.

In this case, it is preferable that a contact angle (θ) between a coil (3b) of the outer coiled part (3) located in a bent portion and a coil (5b) of the inner coiled part (5) being in contact with this coil (3b) of the outer coiled part is 30 degrees or more when the bending structure (1) is bent at 90 degrees. The contact angle (θ) is an angle between a tangent and a line, the tangent between the coils (3b, 5b) of the inner and the outer coiled parts (3, 5) being in contact with each other, and the line connecting a center (C) of the bending of the bending structure and a center (c) of said coil (3b) of the outer coiled part (3).

Bending at 90 degrees means a situation that a central angle of the bent portion (curved portion) of the bending structure (1) is 90 degrees. Further, the center (C) of the bending means a center of curvature of the bent portion. Further, the center (c) of the coil (3b) means a center of a cross section in a direction orthogonal to a direction of an axis of the coil (3b). An upper limit of the contact angle (θ) is a limit within which the dimension of the gap (3c) of the outer coiled part (3) in the axial direction satisfies the aforementioned range.

Further, an overlapping amount between the wire (3a) of the outer coiled part (3) and the wire (5a) of the inner coiled part (5) in the axial direction in the free state is preferably set in a range meeting a≤0.3 D in which a is the overlapping amount, and D is a diameter of the wire (3a) of the outer coiled part (3).

A lower limit of the overlapping amount is a limit within which the axial dimension of the gap (3c) of the outer coiled part (3) satisfies the aforementioned range.

A joint function part (11) to which the bending structure (1) is applied may be configured to have a base part (17) and a movable part (19) displaceable relative to the base part (17). In this case, the bending structure (1) is provided between the base part (17) and the movable part (19) to bend according to displacement of the movable part (19) relative to the base part (17).

Figure 2:
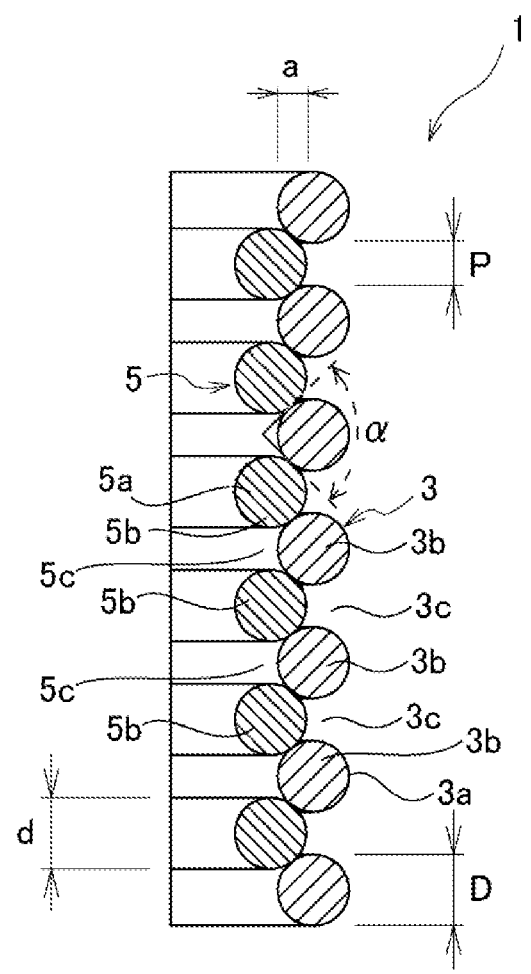
FIG. 2 is an enlarged view illustrating part of the bending structure of FIG. 1.

FIG. 1 is a sectional view illustrating a bending structure according to the embodiment 1 of the present invention, and FIG. 2 is an enlarged view illustrating part of the same.

A bending structure 1 is one applied to a joint function part for, for example, industrial or medical robots, manipulators, actuators and the like.

The bending structure 1 of the present embodiment is double coils bendable relative to an axial direction, and is provided with an outer coiled part 3, and an inner coiled part 5.

The outer coiled part 3 is a coil spring, and is made of a wire 3a wound in a coiled shape to have a plurality of coils 3b in the axial direction. It should be noted that the coil 3b means one turn for composing the coiled shape, and the number of the coils 3b means the number of turns N (the same holds for the inner coiled part 5). The outer coiled part 3 of the present embodiment has resiliency to bend and return with respect to the axial direction of the coiled shape because it is the coil spring.

Material of the wire 3a may be metal, resin or the like. According to the embodiment, a sectional shape of the wire 3a is a circular shape.

A diameter R of the outer coiled part 3 is constant from one end to the other end in the axial direction. The diameter R of the outer coiled part 3 may be, however, varied in the axial direction. In addition, the diameter R is a mean diameter of the coiled shape of the outer coiled part 3 in the present embodiment, but may be an outer or an inner diameter of the coiled shape.

The outer coiled part 3 has a plurality of gaps (pitches) 3c to axially distance axially adjacent coils 3b. The gaps 3c of the present embodiment are formed in respective interspaces of the axially adjacent coils 3c, and all the gaps 3c have the same dimension P in the axial direction. The gaps 3c may be, however, provided in only some interspaces between the coils 3c in the axial direction. Further, the dimensions P of the gaps 3c in the axial direction may be varied.

The dimension P of the gap 3c in the axial direction in a free state of the outer coiled part 3 is set, in relation to the number N of turns of the outer coiled part 3, the diameter R of the outer coiled part 3, and a wire diameter d of the wire 5a of the inner coiled part 5, in a range meeting $\pi R/4N \leq P < d - \pi R/4N$. The setting of the dimension P may be performed according to the diameter R of the outer coiled part 3, the wire diameter D of the wire 3b, the diameter r of the inner coiled part 5 explained later, and the wire diameter d of the wire 5b.

The inner coiled part 5, similar to the outer coiled part 3, is a coil spring made of a wire 5a wound in a coiled shape having a plurality of coils 5b in the axial direction. The inner coiled part 5 has, therefore, resiliency to bend and return relative to the axial direction of the coiled shape as well as the outer coiled part 3.

In the inner coiled part 5, the material of the wire 5a may be metal or resin, and a sectional shape of the wire 5a is a circular shape.

The inner coiled part 5 is coaxially located inside the outer coiled part 3, and is screwed inside the outer coiled part 3. According to the screwing, the coils 5b of the inner coiled part 5 is located in the respective interspaces of the adjacent coils 3b of the outer coiled part 3. The inner coiled part 5 is, therefore, configured that the coils 5b are provided so as to correspond to the gaps 3c of the outer coiled part 3.

Further, the coils 5b of the inner coiled part 5 fit between the adjacent coils 3b of the outer coiled part 3 while being in contact with the adjacent coils 3b according to settings of the diameter r and the wire diameter d of the wire 5a. In addition, the diameter r is a mean diameter of the coiled shape of the inner coiled part 5, but may be an outer diameter or an inner diameter of the coiled shape following the diameter R of the outer coiled part 3.

With the fitting, the wire 3a of the outer coiled part 3 and the wire 5a of the inner coiled part 5 partially overlaps with each other in the axial direction. The overlapping amount a in the axial direction is set in a range meeting a≤0.3 D relatively to the diameter D of the wire 3a of the outer coiled part 3.

In addition, the diameter r of the inner coiled part 5 is constant from one end to the other end in the axial direction. The diameter r of the inner coiled part 5 may be, however, varied in the axial direction according to the diameter R of the outer coiled part 3 or the like.

Further, the wire diameter d of the wire 5a is the same as the wire diameter D of the wire 3a of the outer coiled part 3. The wire diameter d of the wire 5a may be, however, formed larger or smaller than the wire diameter D of the wire 3a of the outer coiled part 3.

The inner coiled part 5 has a plurality of gaps (pitches) 5c to axially distance adjacent coils 5b. The gaps 5c are formed in respective interspaces of the adjacent coils 5b according to the screwing of the inner coiled part into the outer coiled part 3, and all the gaps 5c have the same dimension in the axial direction. The gaps 5c may be, however, provided in only some interspaces between the coils 5*b* in the axial direction and may be varied in axial dimension similar to the outer coiled part 3.

It should be noted that the outer coiled part 3 and the inner coiled part 5 in individual free states have the gaps 3*c*, 5*c* in the respective interspaces between the adjacent coils 3*b* and between the adjacent coils 5*b*. The outer coiled part 3 and the inner coiled part 5 may, however, have structures (close contact springs) in which the adjacent coils 3*b* and the adjacent coils 5*b* are closely contact with each other in individual free states. Further, only one of the outer coiled part 3 and the inner coiled part 5 may be a close contact spring. The individual free states mean that the outer coiled part 3 and the inner coiled part 5 are individually in free states where the inner coiled part 5 is not located inside the outer coiled part 3.

In a case that one or both of the outer coiled part 3 and the inner coiled part 5 is/are the close contact spring(s) in the individual free state, the inner coiled part 5 and the outer coiled part 3 are screwed together, thereby to mutually distance the interspaces between the contacting coils 3*b* and/or between the contacting coils 5*b*. This forms one or both of the gaps 3*c* of the outer coiled part 3 and the gaps 5*c* of the inner coiled part 5. In this case, initial tension may be applied to the bending structure 1 of the double coils.

Figure 3A:
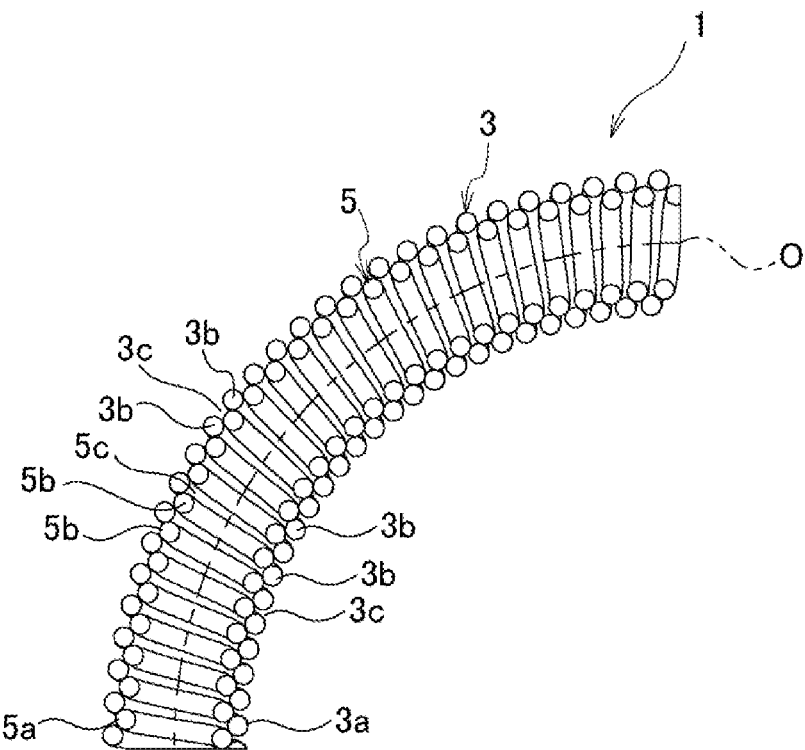
FIG. 3(A) is a sectional view illustrating a bending state of the bending structure of FIG. 1
Figure 3B:
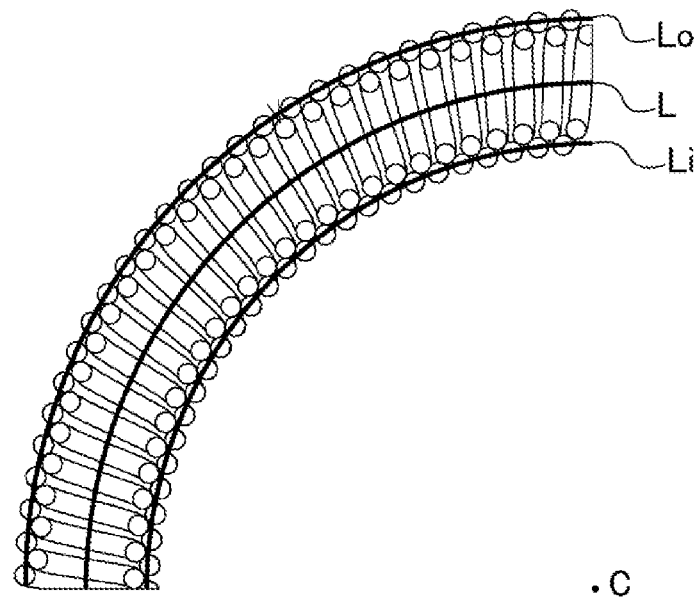
FIG. 3(B) is a sectional view illustrating lengths on an inner side, a center, and an outer side of bending.
Figure 4A:
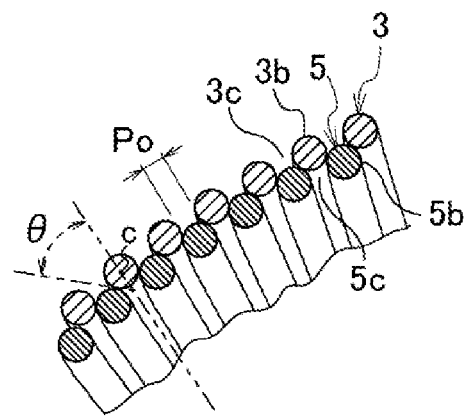
FIG. 4(A) is an enlarged view of the outer side of the bending of FIG. 3
Figure 4B:
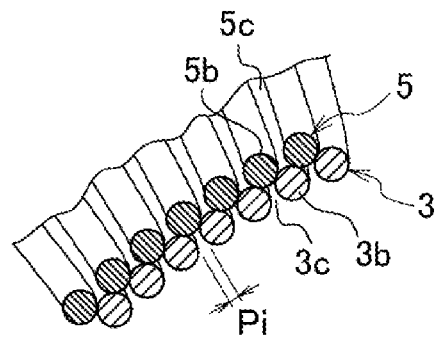
FIG. 4(B) is an enlarged view of the inner side of the bending of FIG. 3.

FIG. 3(A) is a sectional view illustrating a bending state of the bending structure 1 of FIG. 1, and FIG. 3(B) is a sectional view illustrating lengths on the inner side and the outer side of the bending of the same. FIG. 4(A) is an enlarged view of the outer side of the bending of FIG. 3, and FIG. 4(B) is an enlarged view of the inner side of the bending of the same.

In the bending structure 1, as illustrated in FIGS. 1 and 2, the coils 5*b* of the inner coiled part 5 fit between the adjacent coils 3*b* of the outer coiled part 3 while being in contact with the adjacent coils 3*b* when the axis O is in a straight state without bending.

Accordingly, the bending structure 1 is prevented, by the coils 5*b* of the inner coiled part 5 and the coils 3*b* of the outer coiled part 3 preventing the gaps 3*c* of the outer coiled part 3 and the gaps 5*c* of the inner coiled part 5 from being compressed and reduced, from being compressed as a whole even if compressive force acts on the bending structure in the axial direction.

The bending structure 1, therefore, prevents the compression of itself. As a result, the length L on the axis O is kept constant to prevent the bending structure from interfering a member passing inside the bending structure.

As illustrated in FIG. 3(A)-FIG. 4(B), when the axis O of the bending structure 1 is bent, the gaps 3*c* of the outer coiled part 3 are reduced on the inner side of the bending and the gaps 3*c* of the outer coiled part 3 are enlarged on the outer side of the bending.

At this time, the bending structure 1 smoothly bends by diametrally outwardly displacing of the inner coiled part 5. In particular, the present embodiment smoothly performs a series of operations when the bending structure is bent until the bending angle becomes 90 degrees and is returned. Similarly, the operation is smoothly performed as long as the bending angle is less than 90 degrees.

Namely, each coil 5*b* of the inner coiled part 5 is pushed in a bending radius direction by reduction of the gaps 3*c* of the outer coiled part 3 on the inner side of the bending of the bending structure 1. According to the present embodiment, the bending radius direction is a direction along the bending radius of the bending structure 1.

The pushing is easily performed according to a contact angle (free-state contact angle) $\alpha$ between the coils 3*b* and 5*b* of the outer and the inner coiled parts 3, 5 in the free state that is large based on the sectional shape on the diametral inner side of the outer coiled part 3 being the circular arc. In addition, the free-state contact angle $\alpha$ is an angle between tangents at contact portions between the coil 3*b* of the outer coiled part 3 and the coils 5*b* of the inner coiled part 5 contacting said coil of the outer coiled part on both sides in the axial direction (FIG. 2).

According to the pushing of the coils 5*b*, the inner coiled part 5 is displaced outwardly in the bending radius direction as a whole, and this displacement is allowed so that each coil 5*b* of the inner coiled part 5 enters into the enlarged gap 3*c* of the outer coiled part 3.

The bending structure 1, therefore, is the structure in which the compression is prevented in the axial direction whereas the flexibility is never hindered. As a result, the bending structure 1 is stabilized in the bending operation.

Further, when the bending structure 1 is bent, the gaps 3*c* of the outer coiled part 3 are reduced on the inner side of the bending and the gaps of the outer coiled part 3 are enlarged on the outer side of the bending as mentioned above. The size of the gaps 3*c* on the axis O is not changed by comparison with the straight state.

The bending structure 1, therefore, keeps the length of the axis O constant and is prevented from interfering a member passing inside the bending structure at the time of not only the straight state, but also the bending.

Further, in the present embodiment, when the bending structure 1 is returned from the bending state back to the straight state, it is smoothly operated by resiliency of the outer coiled part 3 and the inner coiled part 5.

In this way, the bending structure 1 is smoothly operated without a catch of the inner coiled part 5 by the outer coiled part 3 according to the setting of the dimension P of the gap 3*c* of the outer coiled part 3 when returning back after bent at 90 degrees.

In order to prevent the inner coiled part 5 from being caught by the outer coiled part 3, it is necessary that the coils 5*b* of the inner coiled part 5 are not axially aligned with the coils 3*b* of the outer coiled part 3 on the outer side of the bending. This is because the coils 3*b* of the outer coiled part 3 surely push the coils 5*b* of the inner coiled part 5 back to an original position when the bending structure 1 is returned back from the bending state.

On the outer side of the bending at 90 degrees, a dimension PO of the gap 3*c* of the outer coiled part 3, therefore, needs to be smaller than the wire diameter d of the wire 5*a* of the inner coiled part 5 (PO<d). It should be noted that a short diameter or a long diameter along the axis O may be d in a case that a sectional shape of the wire 5*a* of the inner coiled part 5 is oval.

The dimension PO corresponds to a value which a divided stretch (LO−L) of the axial length of the outer coiled part 3 on the outer side of the bending by the number of turns N is added to the dimension P. L is the axial length of the outer coiled part 3 on the axis O at the bending at 90 degrees, LO is the axial length of the same on the outer side of the bending and is expressed by LO=$2\pi(2L/\pi+R/2)(1/4)$=L+$\pi$R/4.

So, the dimension PO is expressed by PO=P+($\pi$R/4)(1/N). A condition to prevent the inner coiled part 5 from being caught by the outer coiled part 3 on the outer side of the bending is, therefore, expressed by P+($\pi$R/4N)<d. According to the expression, an upper limit of the dimension P is P<d−($\pi$R/4N).

On the other hand, on the inner side of the bending at 90 degrees, the dimension P should be 0 or more (Pi≥0) in order to prevent the inner coiled part 5 from being caught by the outer coiled part 3. The dimension Pi corresponds to a value which a divided shrinkage (Li−L) of the axial length of the outer coiled part 3 on the inner side of the bending by the number of turns N is added to the dimension P.

Li is the axial length of the outer coiled part 3 on the inner side of the bending at 90 degrees and is expressed by Li=2π(2L/π−R/2)(1/4)=L−πR/4.

So, the dimension Pi is expressed by Pi=P−(πR/4)(1/N). A condition to prevent the inner coiled part 5 from being caught by the outer coiled part 3 on the inner side of the bending is, therefore, expressed by P−(πR/4N)≥0. According to the expression, a lower limit of the dimension P is P≥πR/4N.

Since the dimension P in order to prevent the inner coiled part 5 from being caught by the outer coiled part 3 is πR/4N≤P<d−(πR/4N), the setting of the dimension P, therefore, allows the bending structure 1 of the present embodiment to be smoothly operated when returning back after bent at 90 degrees.

When the inner coiled part 5 is displaced at the time of the bending of the bending structure 1, the inner coiled part 5 is prevented from being dropped off from the outer coiled part 3 according to the sectional shape being the circular arc at least on the inner side in the diametral direction of the coiled shape of the outer coiled part 3 without axial increase of the coil 3b of the outer coiled part 3.

In the state that the bending structure 1 is bent at 90 degrees, a contact angle (bending contact angle) θ between the coil 3b of the outer coiled part 3 located in the bent portion and the coil 5b of the inner coiled part 5 contacting said coil 3b is 30 degrees or more.

It should be noted that the bending contact angle θ is an angle between a tangent and a line, the tangent between the contacting coils 3b, 5b of the inner and the outer coiled parts 3, 5 and the line connecting a center C of the bending and a center c of the coil 3b of the outer coiled part 3.

With the bending contact angle θ, the coils 5b of the inner coiled part 5 are surely pushed by the coils 3b of the outer coiled part 3 on the outer side of the bending when the bending structure 1 is returned from the bending state.

Further, the present embodiment sets the axially overlapping amount a between the wire 3a of the outer coiled part 3 and the wire 5a of the inner coiled part 5 in the range meeting a≤0.3 D, to surely make the bending contact angle θ 30 degrees or more and ensure the smooth operation of the bending structure 1.

As mentioned above, the bending structure 1 of the present embodiment is bendable with respect to the axial direction and is provided with the outer coiled part 3 formed of the wire 3a which is wound in the coiled shape to have the plurality of the coils 3b in the axial direction, and the inner coiled part 5 formed of the wire 5a which is wound in the coiled shape to have the plurality of the coils 5b in the axial direction and located inside the outer coiled part 3.

The bending structure 1, therefore, is configured by locating the inner coiled part 5 inside the outer coiled par 3, thereby to simplify its structure.

The outer coiled part 3 has the plurality of the gaps 3c to distance the adjacent coils 3b in the axial direction, and the coils 5b of the inner coiled part 5 are provided so as to correspond to the gaps 3c of the outer coiled part 3 and fit between the adjacent coils 3b of the outer coiled part 3 while being in contact with the adjacent coils 3b.

Further, the gaps 3c of the outer coiled part 3 and the gaps 5c of the inner coiled part 5 are prevented from being compressed using the coils 5b of the inner coiled part 5 and the coils 3b of the outer coiled part 3, so that the bending structure 1 is prevented from being compressed as whole even if compressive force acts in the axial direction.

Further, at the time of the bending of the bending structure 1, the inner coiled part 7 is displaced toward the outer side of the bending while the gaps 3c of the outer coiled part 3 are reduced on the inner side of the bending, and the gaps of the outer coiled part 3 are enlarged on the outer side of the bending to allow the displacement of the inner coiled part 5, thereby to ensure sufficient flexibility even while the rigidity in the axial direction is ensured.

As a result, the bending structure 1 enables its structure to be simplified while stabilizing the bending operation, so that it ensures stability of operation of a device such as a robot, manipulator, or actuator having the joint function part.

Then, the dimension P is set in the range meeting πR/4N≤P<d−πR/4N in which P is the dimension of the gap 3c of the outer coiled part 3 in the axial direction, N is the number of turns of the outer coiled part 3, R is the diameter of the outer coiled part 3, and d is the wire diameter of the wire 5a of the inner coiled part 5.

The present embodiment, therefore, smoothly operates the bending structure according to the setting of the dimension P of the gap 3c of the outer coiled part 3 without a catch of the inner coiled part 5 by the outer coiled part 3 when the bending structure returns after bent at 90 degrees.

Further, the present embodiment repeatedly smoothly operates the bending structure 1 between the bending state and the straight state according to the resiliency of the outer coiled part 3 and the inner coiled part 5.

Further, the bending structure 1 of the present embodiment is prevented from being deformed or collapsed based on diametrally acting external force according to the resiliency of the outer coiled part 3 and the inner coiled part 5 in the diametral direction. This protects the member passing inside the bending structure.

Further, in the bending structure 1 of the present embodiment, the gaps 3c of the outer coiled part 3 are reduced on the inner side of the bending and the gaps 3c of the outer coiled part 3 are enlarged on the outer side of the bending. The length on the axis O of the outer coiled part 3 is not changed by comparison with the straight state, and the bending structure is prevented from interfering the member passing inside the bending structure.

Since the outer coiled part 3 of the present embodiment has the sectional shape being the circular arc on at least the inner side in the diametral direction of the coiled shape, the free-state contact angle α between the coils 3b and 5b of the inner and the outer coiled parts 3, 5 is enlarged to easily perform the displacement of the inner coiled part 5 at the time of the bending.

Further, when the inner coiled part 5 is displaced, the inner coiled part 5 is prevented from being dropped off from the outer coiled part 3 according to the sectional shape of the wire 3a of the outer coiled part 3 being circular arc on at least the inner side in the diametral direction of the coiled shape without axial increase of the coil 3b of the outer coiled part 3.

According to the present embodiment, since the sectional shape of the wire 5a of the inner coiled part 5 is the circular arc at least on the outer side in the diametral direction of the coiled shape, it surely enlarges the free-state contact angle α between the coils 3b and 5b of the inner and the outer coiled parts 3, 5.

Further, the bending structure 1 of the present embodiment has the bending contact angle θ between the coil 3b of the outer coiled part 3 located in the bent portion and the coil 5b of the inner coiled part 5 contacting said coil 3b 30 degrees or more at the time of the bending at 90 degrees.

The present embodiment, therefore, more surely pushes back the coils 5b of the inner coiled part 5 using the coils 3b of the outer coiled part 3 on the outer side of the bending, more smoothly operate the bending structure 1.

Further, the present embodiment sets the axially overlapping amount a between the wire 3a of the outer coiled part 3 and the wire 5a of the inner coiled part 5 direction in the range meeting a≤0.3 D relative to the diameter D of the wire 3a of the outer coiled part 3.

With this, the present embodiment surely makes the bending contact angle θ 30 degrees or more, to ensure the smooth operation of the bending structure 1.

Figure 5:
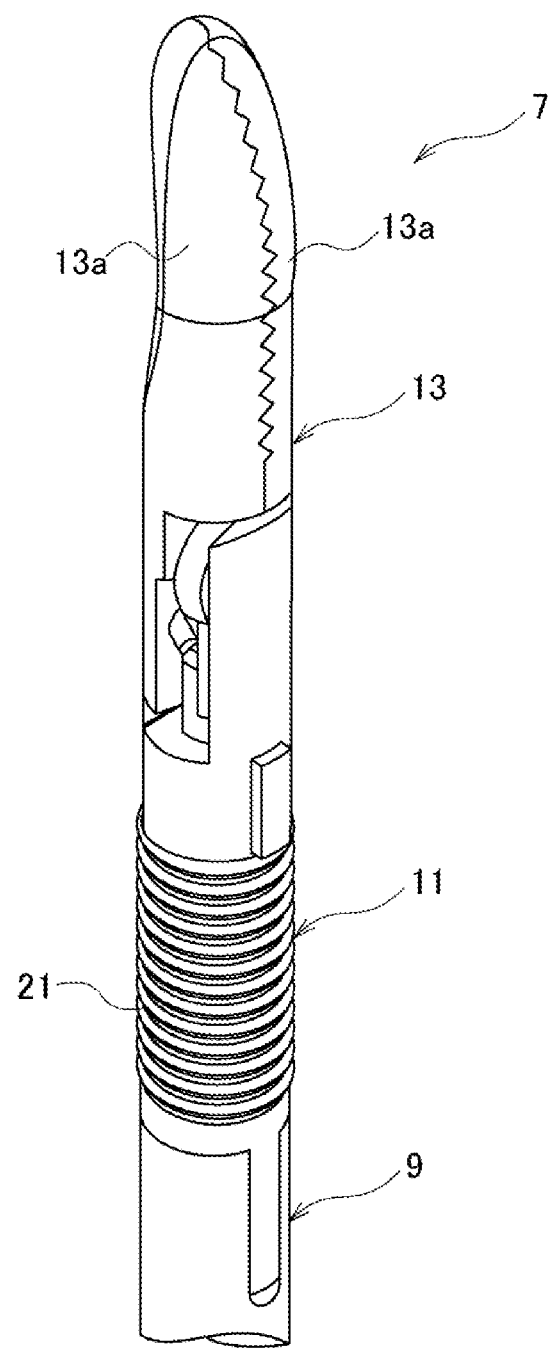
FIG. 5 is a perspective view of a manipulator having a joint function part to which a bending structure is applied according to an embodiment 2 of the present invention.
Figure 6:
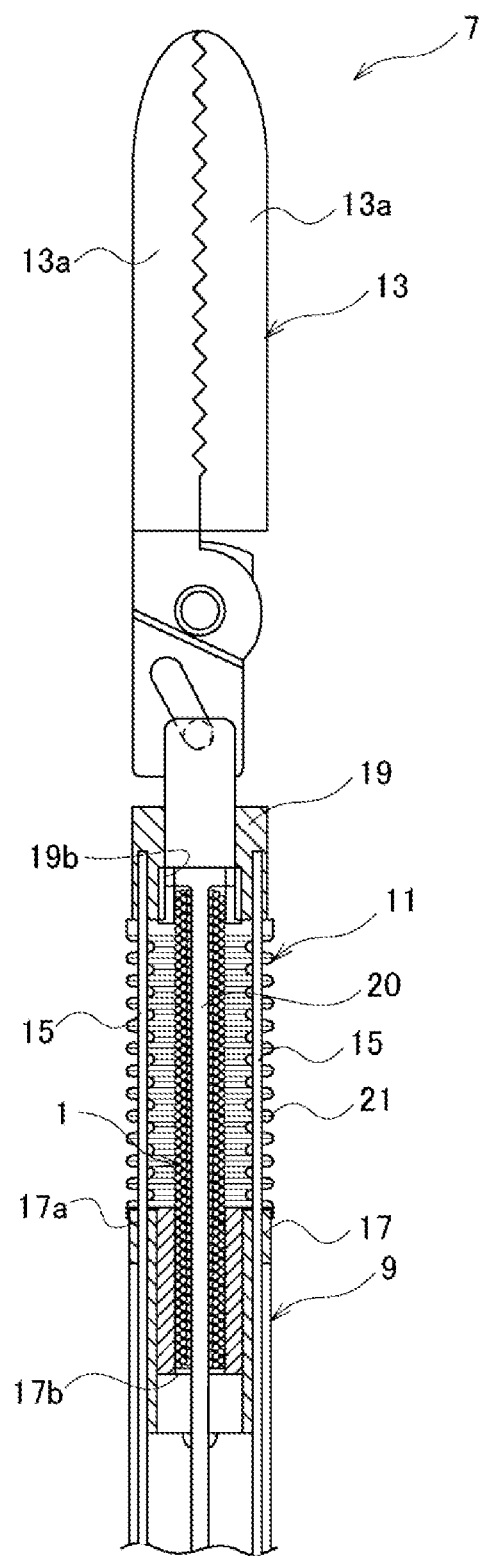
FIG. 6 is a sectional view of the manipulator of FIG. 5.

FIG. 5 is a perspective view of a manipulator having a joint function part to which a bending structure is applied according to the embodiment 2 of the present invention. FIG. 6 is a sectional view of the manipulator of FIG. 5. In addition, components in the embodiment 2 corresponding to in the embodiment 1 are represented with the same reference numerals to eliminate duplicate explanation.

The present embodiment forms a joint function part 11 of a manipulator 7 using the bending structure 1 of the embodiment 1.

In addition, the manipulator 7 is an example of a device having a joint function part. Namely, a device having a joint function part may be a robot, a manipulator, an actuator or the like in various fields as long as it has a joint function part to perform bending operation. Further, in a case of a medical manipulator, an endoscope camera, manual forceps and the like that are not attached to surgical robots are included in addition to forceps attached to surgical robots.

The manipulator 7 of the present embodiment is configured by a shaft 9, a joint function part 11, and an end effector 13.

The shaft 9 is formed into, for example, a cylindrical shape. In the shaft 9, passed are drive wires 15 to drive the joint function part 11 and a flexible member 20 comprising a push-pull cable to drive the end effector 13. On the front end side of the shaft 9, the end effector 13 is provided through the joint function part 11.

The joint function part 11 is provided with a base part 17, a movable part 19, a flexible tube 21, and a bending structure 1.

The base part 17 is a column body formed of resin, metal or the like, and is attached to the front end of the shaft 9. The base part 17 passes the drive wires 15 through through-holes 17a in the axial direction and passes the flexible member 20 through an insertion hole 17b on an axial center portion.

The movable part 19 is a column body formed of resin, metal or the like and is attached to the end effector 13. To the movable part 19, front ends of the drive wires 15 are fixed. Accordingly, the movable part 19 displaces relatively to the base 17 to orient the end effector 13 to a desired direction according to operation of the drive wires 15. On an axial center portion of the movable part 19, an insertion hole 19a is provided to pass the flexible member 20.

The flexible tube 21 is interposed between the base part 17 and the movable part 19 and is bent according to the displacement of the movable part 19 relative to the base part 17. The flexible tube 21 passes the drive wires 15 and the bending structure 1 therethrough in the axial direction.

The flexible tube 21 of the present embodiment is configured by bellows comprising a tube body having a waveform section. The flexible tube 21 may be, however, a coil spring, a cylindrical body or the like and is not particularly limited as long as it has a flexible tube form.

The bending structure 1 has the same configuration as the embodiment 1. The bending structure 1 is arranged along an axial center portion of the flexible tube 21, and is provided between the base part 17 and the movable part 19.

The bending structure 1 has both ends attached to the insertion holes 17a and the 19a of the base part 17 and the movable part 19, respectively in a state that the flexible member 20 is inserted inside the bending structure. With this, the bending structure 1 supports the movable part 19 with respect to the base part 17 so as not to be movable in the axial direction and is bendable as well as the flexible member 20 according to the displacement of the movable part 19 relative to the base part 17.

The flexible member 20 is axially movably inserted into the bending structure 1 to limit diametral deviation of the inner and the outer coiled part 3, 5. According to this, the bending structure 1 also has a function to guide the flexible member 20 in the axial direction.

The end effector 13 of the present embodiment is medical forceps, a pair of holding parts 13a of which are pivotally supported to the movable part 19 of the joint function part 11 so as to be opened and closed. The flexible member 20 passed through the joint function part 11 is connected to the end effector 13 and the holding part 13a are opened and closed according to axial movement (reciprocation operation) of the flexible member 20.

It should be noted that the end effector 13 may be, for example, scissors, a holding retractor, a needle driver or the like other than the forceps. Further, the end effector 13 is not limited for medical use and may be for industrial use.

In the manipulator 7 having the structure, an operator such as a doctor reciprocates the flexible member 20, thereby to cause the holding parts 13a of the end effector 13 to perform opening/closing operation.

Further, the operator pulls any one or some of the driving wires 15 to bend the joint function part 11, thereby to orient the end effector 13 toward a desired direction relative to the shaft 9. In this state, if the flexible member 20 is reciprocated, the holding parts 13a of the end effector 13 is caused to perform the opening/closing operation.

The opening/closing operation is stabilized and accurately performed because the flexible member 20 passes on the axis O of the bending structure 1 and the moving amount of the flexible member 20 is constant according to the length L on the axis O of the bending structure 1.

In addition, the present embodiment provides the same effect as the embodiment 1.

The invention claimed is:

1. A bending structure being bendable with respect to an axial direction, comprising:
   an outer coiled part formed of a wire which is wound in a coiled shape to have a plurality of coils in the axial direction; and
   an inner coiled part formed of a wire which is wound in a coiled shape to have a plurality of coils in the axial direction and located inside the outer coiled part, wherein
   the outer coiled part has a plurality of gaps to distance adjacent coils in the axial direction,
   the coils of the inner coiled part are provided so as to correspond to the gaps of the outer coiled part and fit between the adjacent coils of the outer coiled part while being in contact with the adjacent coils of the outer coiled part, and a dimension (P) is set in a range meeting $\pi(R)/4(N) \leq P < (d)-\pi(R)/4(N)$ in which (P) is the dimension of a gap of the outer coiled part in the axial direction in a free state, (N) is the number of turns of the outer coiled part, (R) is a diameter of the outer coiled part, and (d) is a wire diameter of the wire of the inner coiled part.

2. The bending structure according to claim 1, wherein a sectional shape of the wire of the outer coiled part is a circular arc on at least an inner side in a diametral direction of the coiled shape, and a sectional shape of the wire of the inner coiled part is a circular arc on at least an outer side in a diametral direction of the coiled shape.

3. The bending structure according to claim 2, wherein a contact angle between a coil of the outer coiled part located in a bent portion and a coil of the inner coiled part being in contact with said coil of the outer coiled part is 30 degrees or more when the bending structure is bent at 90 degrees, and the contact angle is an angle between a tangent and a line, the tangent between the coils of the inner and the outer coiled parts being in contact with each other, and the line connecting a center of bending of the bending structure and a center of said coil of the outer coiled part.

4. The bending structure according to claim 3, wherein an overlapping amount between the wire of the outer coiled part and the wire of the inner coiled part in the axial direction in the free state is set in a range meeting $(a) \leq 0.3$ (D) in which (a) is the overlapping amount, and (D) is a diameter of the wire of the outer coiled part.

5. A joint function part to which the bending structure according to claim 1 is applied, comprising:

a base part and a movable part displaceable relative to the base part, wherein the bending structure is provided between the base part and the movable part to bend according to displacement of the movable part relative to the base part.

* * * * *